(12) United States Patent
Spiro

(10) Patent No.: US 11,565,597 B2
(45) Date of Patent: *Jan. 31, 2023

(54) WIRELESS ELECTRIC VEHICLE CHARGING MANAGED BY A PARKING MANAGER DEVICE

(71) Applicant: LIGHTING DEFENSE GROUP, LLC, Scottsdale, AZ (US)

(72) Inventor: Daniel S. Spiro, Scottsdale, AZ (US)

(73) Assignee: LIGHTING DEFENSE GROUP, LLC, Scottsdale, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/334,722

(22) Filed: May 29, 2021

(65) Prior Publication Data

US 2021/0380003 A1 Dec. 9, 2021

Related U.S. Application Data

(63) Continuation-in-part of application No. 16/841,399, filed on Apr. 6, 2020, now Pat. No. 11,071,204, which is a continuation-in-part of application No. 16/242,666, filed on Jan. 8, 2019, now Pat. No. 10,653,014, which is a continuation of application
(Continued)

(51) Int. Cl.
*B60L 53/126* (2019.01)
*B60L 53/38* (2019.01)
*B60L 53/66* (2019.01)

(52) U.S. Cl.
CPC .......... *B60L 53/126* (2019.02); *B60L 53/38* (2019.02); *B60L 53/665* (2019.02); *B60L 2250/16* (2013.01)

(58) Field of Classification Search
CPC ...... G06Q 30/0266; G07B 15/02; G08G 1/14; G08G 1/202; G08G 1/146
See application file for complete search history.

(56) References Cited

U.S. PATENT DOCUMENTS 6,307,330 B1 10/2001 So
RE38,767 E 8/2005 Wedell et al.
(Continued)

FOREIGN PATENT DOCUMENTS

CN 202617435 12/2012
CN 203352881 12/2013
WO 2015193059 12/2015

*Primary Examiner* — Mirza F Alam
(74) *Attorney, Agent, or Firm* — Xsensus LLP

(57) ABSTRACT

A system for charging an electric vehicle having at least one power induction coil under control of a processor wirelessly charges an electric vehicle, wherein the at least one power induction coil is positioned in proximity to a parking location; and a parking manager device manages permissions for electric vehicles to park in one or more parking locations included in a parking zone associated with the parking manager device, wherein the parking manager also manages permissions for electric vehicles to charge via wireless charging while parked in the one or more parking locations, wherein the parking manager device has a unique address and the zone, parking locations, and charging stations associated with the parking manager device have associated unique sub-addresses associated with the parking manager device unique address.

20 Claims, 6 Drawing Sheets

Related U.S. Application Data

No. 15/884,107, filed on Jan. 30, 2018, now Pat. No. 10,215,351, which is a continuation of application No. 14/757,923, filed on Dec. 28, 2015, now Pat. No. 9,885,451, which is a continuation-in-part of application No. 14/166,056, filed on Jan. 28, 2014, now Pat. No. 9,829,185.

(60) Provisional application No. 61/767,035, filed on Feb. 20, 2013.

(56) References Cited

U.S. PATENT DOCUMENTS

| | | | |
|---|---|---|---|
| 7,893,848 B2 * | 2/2011 | Chew | G08G 1/14 |
| | | | 701/25 |
| 8,475,002 B2 | 7/2013 | Maxik et al. | |
| 2007/0109142 A1 | 5/2007 | McCollough | |
| 2012/0038281 A1 | 2/2012 | Verfuerth | |
| 2012/0038490 A1 | 2/2012 | Verfuerth | |
| 2012/0323643 A1 * | 12/2012 | Volz | G06Q 30/0631 |
| | | | 705/13 |
| 2014/0035526 A1 * | 2/2014 | Tripathi | B60L 53/36 |
| | | | 320/109 |
| 2014/0072178 A1 * | 3/2014 | Carbonell | G08G 1/142 |
| | | | 382/105 |
| 2017/0270795 A1 * | 9/2017 | Vaidyanathan | G08G 1/148 |
| 2019/0088128 A1 * | 3/2019 | Adireddy | G06Q 30/0284 |

* cited by examiner

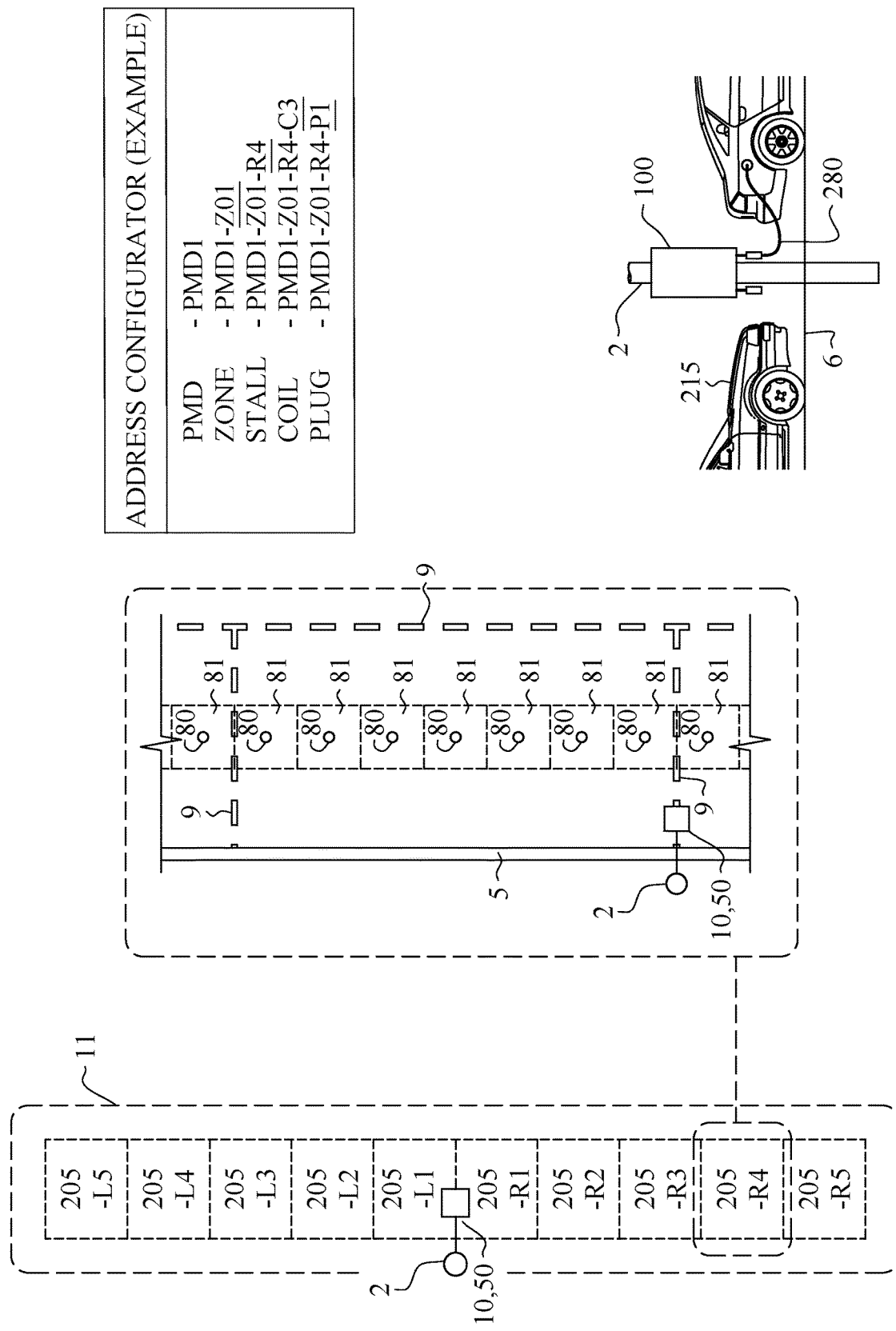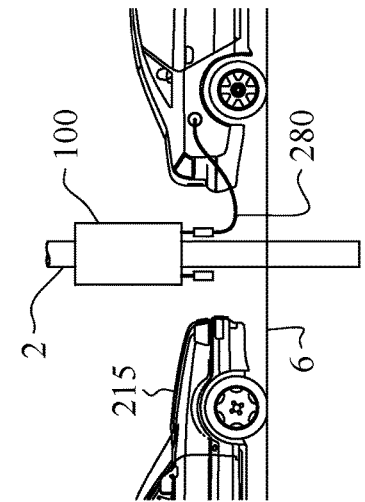
FIG. 1C
FIG. 1B
FIG. 1A

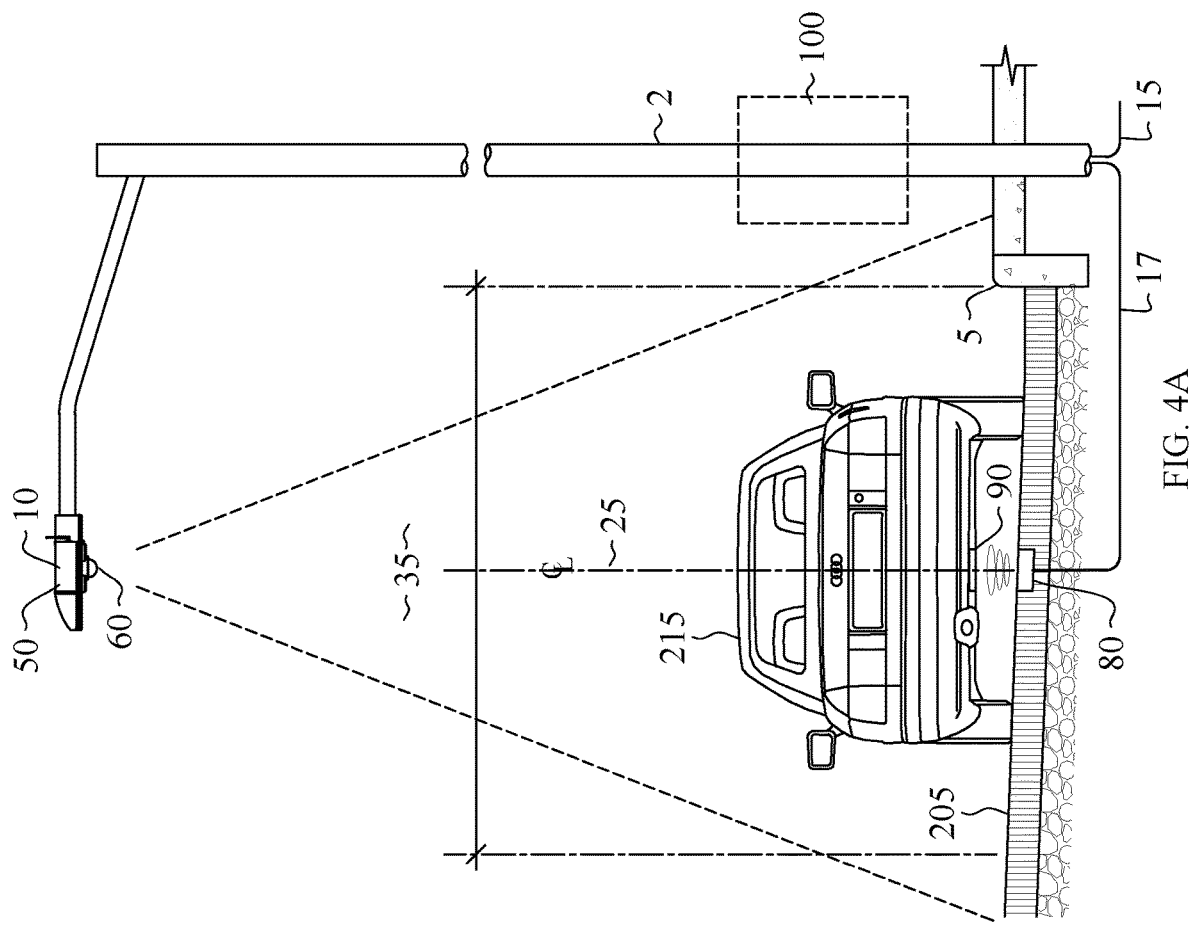
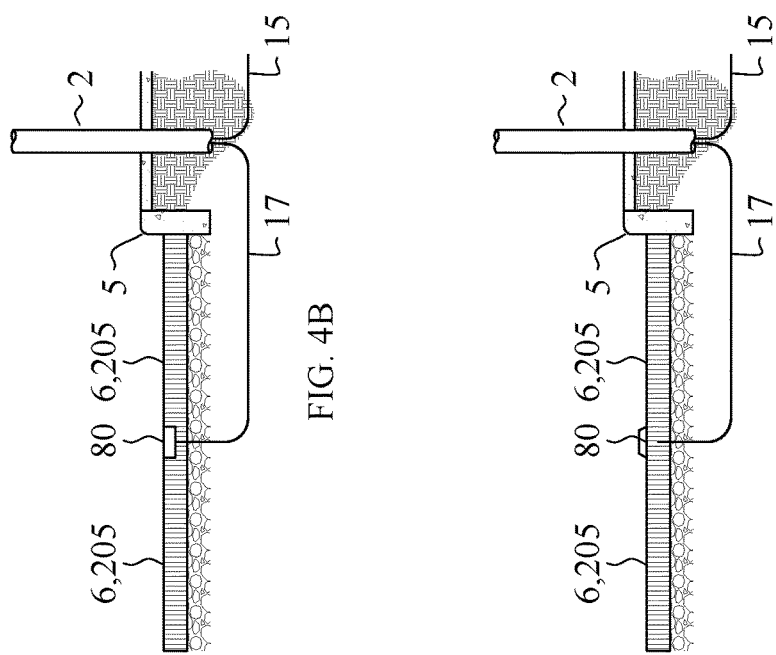

WIRELESS ELECTRIC VEHICLE CHARGING MANAGED BY A PARKING MANAGER DEVICE

CROSS REFERENCE AND PRIORITY CLAIM

This application is a continuation-in-part of and claims the benefit of U.S. patent application Ser. No. 16/841,399 filed Apr. 6, 2020; which is a continuation-in-part and claims the benefit of U.S. patent application Ser. No. 16/242,666 filed Jan. 8, 2019, now U.S. Pat. No. 10,653,014; which is a continuation of and claims the benefit of U.S. patent application Ser. No. 15/884,107 filed Jan. 30, 2018, now U.S. Pat. No. 10,215,351; which is a continuation of U.S. patent application Ser. No. 14/757,923 filed Dec. 28, 2015, now U.S. Pat. No. 9,885,451; which is a continuation-in-part and claims the benefit of U.S. patent application Ser. No. 14/166,056 filed Jan. 28, 2014, now U.S. Pat. No. 9,829,185; which claims the benefit of U.S. Provisional Application No. 61/767,035 filed Feb. 20, 2013, and incorporates the disclosure of each of the listed applications by reference. To the extent that the present disclosure conflicts with any referenced application, however, the present disclosure is to be given priority.

FIELD

Disclosed embodiments pertain to Electric Vehicle (EV) charging. In particular, disclosed embodiments pertain to EV charging using, for example, "wireless charging" provided under the control of, and/or in coordination with, a Parking Manager Device (PMD).

BACKGROUND

The EV is expected to replace vehicles consuming fossil fuel in the U.S. by 2040. The EV market is likely to be divided into two vehicle classes—a self-driving and a driver-controlled vehicle with an optional feature to turn the vehicle into a driverless. Today, EV manufacturers are working on overcoming challenges that slow down EV market acceptance. These challenges include, vehicle power supply weight, vehicle power supply efficiency, the high cost of vehicle power supply material, the relatively short life of the power supply, the limited travel range of the power supply, the duration required to charge the power supply, the absence of global standards to charge vehicles, and the absence of power chargers to charge a vehicle for its specific needs. Furthermore, presently, there is no city/state or federal vision for providing an efficient infrastructure to support the ever growing numbers of EV's on the road.

SUMMARY

The following presents a simplified summary in order to provide a basic understanding of some aspects of various invention embodiments. The summary is not an extensive overview of the invention. It is neither intended to identify key or critical elements of the invention nor to delineate the scope of the invention. The following summary merely presents some concepts of the invention in a simplified form as a prelude to the more detailed description below.

Illustrative embodiments relate to a system, methods and components for providing EV charging under the control of, and/or in coordination with a PMD.

In accordance with various embodiments, EV charging is performed using wireless charging under the control and/or in coordination with a PMD.

BRIEF DESCRIPTION OF FIGURES

Disclosed embodiments will be described with reference to the accompanying figures, in which:

FIGS. 1A, 1B, and 1C illustrate examples of how the power induction coils can be associated with a PMD in accordance with at least one disclosed embodiment.

FIGS. 4A, 4B, and 4C illustrate cross-sections of examples of parking locations configured in accordance with disclosed embodiments. In particular, FIG. 4A is a section through a parking location and adjacent sidewalk showing power distribution to a wireless power induction coil below a vehicle. FIG. 4B is a transverse section through a parking location showing a wireless power induction coil embedded in pavement. FIG. 4C is a transverse section through a parking location showing a wireless power induction coil coupled to the pavement surface.

DETAILED DESCRIPTION

Figure 2:
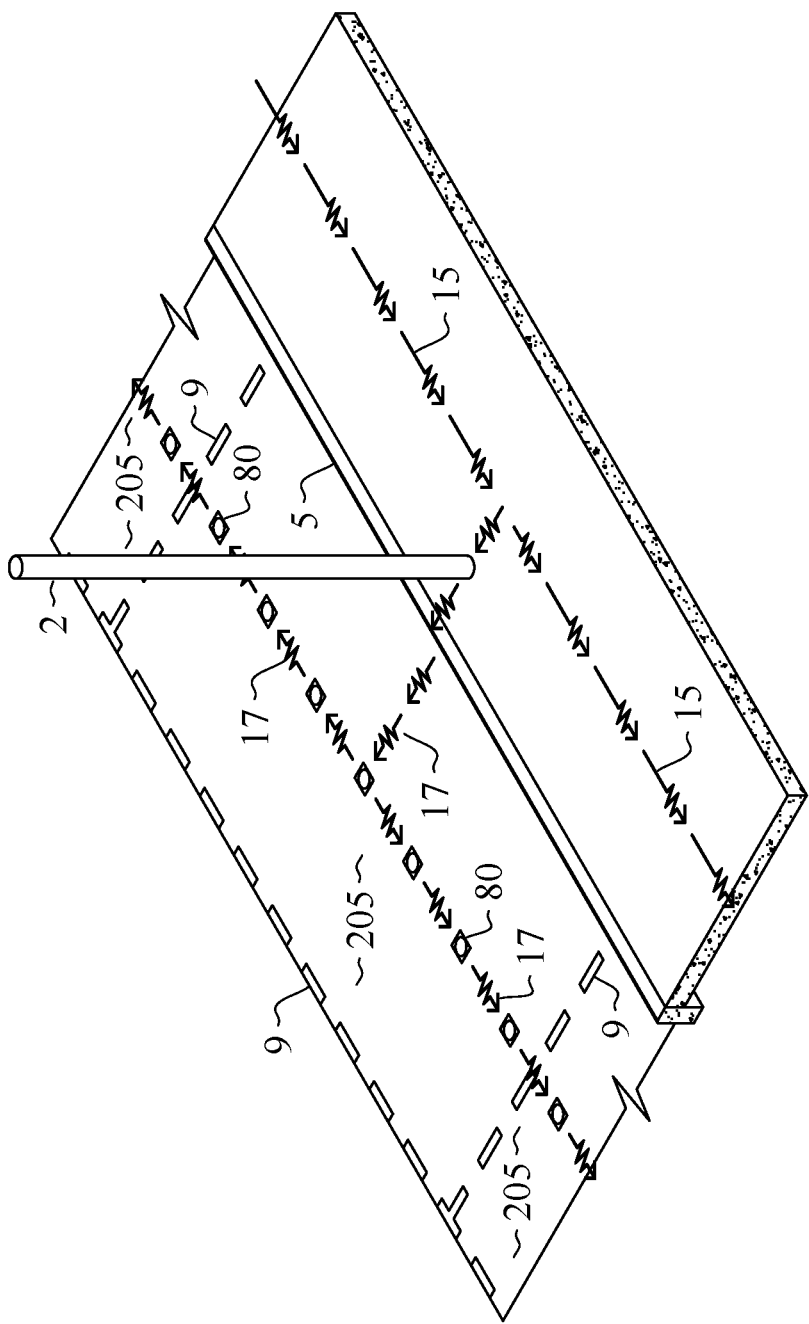
FIG. 2 illustrates a perspective view of an example of a parking location configured in accordance with at least one disclosed embodiment.

In the U.S., commercially available charging of an EV requires manual connectivity. This involves a driver plugging in a charging cable of a charging station to establish a path to subsequently convey power to a built-in receptacle in the EV following or as part of interaction with a user interface associated with the charging station.

Of note, the equipment of the charging station requires space regardless of where the EV is parked. For example, in both the commercial public and private sectors, such equipment requires dedicated locations. As a result, the installation of electrical charging stations is costly especially where electrical power tap-in to an electrical network is not already present in a vicinity of the proposed charging station installation.

An alternate EV charging solution has emerged in the most recent decade. This solution is conventionally known as "wireless charging" accomplished through Wireless Power Technology (WPT). Wireless charging does not require physical connectivity between a power source and an EV power supply. Rather, charging is accomplished by placing induction coils (e.g., two) in proximity to one another, wherein one of the coils, i.e., a power induction coil, is coupled to or positioned in a stationary surface and one of the coils, i.e., the power receiving coil, is coupled to or integrated within the EV.

First generation, WPT technology was conventionally termed wireless "induction charging." However, presently, WPT technology has evolved to provide more efficient charging technology, for example, wireless magnetic resonance charging technology. Along with this technology advancement, efforts by the manufacturers of magnetic resonance technology to standardize the industry have resulted in the adoption of several standards, including SAE J2954, SAE J1772, and SAE J2954/2 (each incorporated by reference in their entirety).

At present, inductive magnetic resonance coupling has demonstrated improved power transfer efficiency over traditional inductive chargers, while requiring less precise vehicle alignment between a power induction coil and a power receiving coil.

Still further, while magnetic resonance technology for EV charging may be the state of the art in the U.S. today, globally there are a number of competing technologies researched and under development. Thus, it is fair to assume that WPT technology will continue to improve over time, and global standards will be adopted so as enable large scale transition to EV products considering that the transportation vehicle industry comprises multi-national corporations.

Thus, as more EV's populate the urban landscape, implementation challenges regarding how to integrate EV power charging needs with the existing and future urban infrastructure are becoming more pressing. Specific issues include:
  How to associate a mobile EV with the precise geographic location in real time
  How to make EV charging accessible everywhere, rather than only at filling stations
  How to dispense wireless charging safely
  How to automatically couple wireless induction coils in a sustainable manner, where one coil is coupled to a pavement and the other is coupled to a vehicle
  How to bill for power provided by wireless charging Disclosed embodiments are configured to provide a system, methodologies and components to provide inexpensive solutions to the above issues. In particular, disclosed embodiments provide systems, methods and components for providing EV charging under the control of, and/or in coordination with a PMD, in particular using wireless charging.

The present embodiments are a practical application of ongoing work of the present invention and build upon previous innovations related to control and cooperation of the innovations of earlier patents (see Cross Reference and Priority Claim) that describe a variety of functionalities derived from a vertical structure that has access to electric power within an urban environment city.

More specifically, street, signaling, and surface mounted poles have power delivered to at least one power consuming device such as a luminaire; these configurations populate urban and suburban public and private roadways and parking lots. Of note, many of these poles have already been replaced or retrofitted with LED lighting that consumes as little as fifty percent of the power these light emitting poles were configured for when initially installed.

Of further note, in many locations, the cost associated with installation of such poles has was paid off years ago by the private, quasi-governmental or governmental entity that procured the investment to perform the installation.

Of particular relevance, these lighting poles in the U.S., with the exception of signal lighting, are non-operational during the daytime. In other words, although power is still supplied to the poles throughout a twenty-four hour period, the lighting poles only draw power during that portion of the time that requires lighting of the street environment.

As a result, the poles populating the urban and suburban environments are underutilized vertical real estate that the present innovation aims to take advantage of.

Presently, it is difficult to anticipate the power demand on the subject innovation as the efficiency of elements associated with the system are ever improving. While the above teaches on a reliance on existing electrified poles, if power demand exceeds present electrified pole power allocation, the power or power and data circuits can be upgraded and/or additional power or power and data circuits can be added. As is, work associated with the existing locations of such circuits and any new circuits conveyed alongside of the existing circuit is unlikely disrupt vehicular traffic.

In Application U.S. Ser. No. 16/841,399, the Applicant taught and illustrated how an Intermediate Device Structure (IDS) can effectively manage parking systems via a PMD module. In that disclosure, incorporated by reference, the PMD coupled to the IDS, acts as a decentralized controller of parking manager functionality, wherein the PMD functionality (at least partially) resides on a pole (or vertical structure) having connection to a power/electrification network; additionally, the PMD functionality is configured to communicatively coupled to stationary and mobile devices either through known wired or wireless communication technology.

Accordingly, a PMD may include a processor, resident memory (with stored code that can include Artificial Intelligence code), a bi-directional communication module, a sensing device, or a combination thereof. At its most basic level, a PMD may manage a parking zone within its vicinity having at least one parking location, e.g., what may be commonly referred to as a parking space, a parking stall, etc.

As a result, the PMD may be configured to have a unique identification address within a communication network, wherein that address is associated with the PMD's assigned geographic location zone and constituent parking location (s); as a result, each of the constituent parking locations may be both associated with their PMD and have their own unique sub-addresses that may, optionally, include identification of the associated PMD zone address.

PMDs may be disposed on an elevated structure including a pole and manage a parking zone by monitoring activity at each parking location included in the zone. Thus, the PMD may be configured to identify each parking location by a unique sub-address associated with the manager, and monitors the occupancy of any parking location within its designated zone, employing sensing devices interactively engaging vehicle embedded and/or related portable devices.

The present innovation enhances the previously disclosed PMD's technical utility by augmenting that functionality with the ability to provide, control, automate and coordinate both wired and wireless EV charging capability at one or more parking locations associated with the PMD. Still further, because of the previously disclosed cooperation and coordination of operations provided by Applicant's PMD, the present innovation enables the ability to provide such distributed and coordinated functionality to maximize the ability to charge EVs within an urban and suburban environment.

Of particular note for urban environmental implementation, PMD coordinated communication and cooperation disclosed in U.S. Ser. No. 16/841,399 provide significant improvement over satellite implemented, way-finding technology. This is because, PMD implemented technology and systems map areas that they oversee by sub-dividing the geographic area into a large number of pixilated fields that are monitored in real-time. As a result of this real-time monitoring, PMD implemented systems have far more precise navigational capabilities than inputs from a satellite communication network. Further, unlike the satellite, the PMD's operation does not suffer from masking or latency difficulties. This is a persistent problem when using satellite feed in urban settings. The PMD is in full sensing and communication view of areas it manages.

The resulting from the PMD increased accuracy having multiple sensed sub-fields and the absence of masking and latency issues results in improved operational safety associated with electrified systems as required with EV charging.

Perhaps the most compelling reason for employing the PMD implemented technology in association with EV charging is the low cost associated with implementing such a system in existing urban and suburban settings. With the increase in volume in EVs to be charged and the consistently high cost of infrastructure construction in urban environments, using PMD implemented technology to provide charging, in particular, wireless charging, would provide readily available and adaptable EV infrastructure installation. Thus, PMD implemented technology, as disclosed herein, provides the opportunity to turn a cityscape into an EV-friendly environment virtually overnight.

FIGS. 1A, 1B, and 1C show examples of how power induction coils can be associated with a PMD optionally disposed in an elevated Independent Device Structure (IDS) 10. FIG. 1A shows a pole mounted PMD 50 disposed inside an IDS 10 above a zone that includes, for example, ten parking locations 205. To compose associated addresses to each of the above elements, the PMD 50 and all other system components may have numeric or alphanumeric addresses.

For example, in one potential implementation, the PMD 50 may be a first and prime associated number. The PMD 50 may be associated with a geographic zone the IDS 11 manages. The location or element address may follow with the letter Z. In some applications, where there is only one zone, the zone designation may be omitted. The parking location may follow with the parking location disposed to the left side of the pole 2 displaying the letter L for a prefix, and the parking location may be disposed to the right showing the prefix R. Optionally, the orientation may be as one faces the roadway. In one potential implementation, the numerical value that follows the prefix may be the parking location number counted from the vicinity of the pole 2 outwardly.

FIG. 1B shows an enlargement of an implementation example of parking location 205. In this example, parking location R4 may include, for example, nine power inducing EV charging coils 80 disposed in proximity to the parking location's 205 longitudinal axis center. Each of the coils 80 may have a unique address that may be controlled by at least the PMD 50 managing the zone 11 and the parking locations included within or associated with the zone.

FIG. 1C shows a partial elevation of an implementation example in which a pole 2 is coupled to an EV power charging station 100. The station 100 may include, for example, two plug-in charging cables 280, e.g., at the bottom, with one extending from the station 100 to an EV 215 to provide connected EV charging. It should be appreciated that, in at least some implementations and applications, physical connectivity to a power charging station 100 may be preferred. Such may be the case, for example, as the number of EVs includes mostly vehicles that require connected charging.

Further, such may be the case, for example, when various EVs have significantly different charging protocols and requirements that are most effectively ascertained and controlled via connected charging. It is predicted that that these challenges will likely resolve themselves with the evolution of EV charging technology, protocols and standards. However, in the immediate implementation horizon, the disclosed embodiments presently provide a multitude of flexible, scalable and implementable charging configurations to meet the evolving need for EV charging in the urban and suburban landscape. Accordingly, it should be understood that the technical utility of the present innovation is rooted in the ability to effectively implement EV charging capability in common parking locations within urban settings, drawing power from lighting poles of various types and being managed by a PMD, optionally performed in cooperation with other PMDs to provided EV charging in a distributed, cost efficient, load balanced manner.

It should be appreciated that stations 100 could be easily installed on the pole 2. Thus, connected charging (Plug-in stations) could be coupled to a pole and have a prefix of the letter P. In implementation, such a plug-in station 100 can at least be communicatively coupled to the PMD 50 by means of a handheld device. An exemplary table showing an address configuration logic is shown in FIG. 1C.

FIG. 2 shows a perspective view of a parking location 205 defined by dash dividing lines 9, longitudinally disposed along a sidewalk curb 5. Electrical power may be conveyed inside a conduit 15 below the sidewalk grade to deliver power to a pole 2 (partially shown). From the pole 2, conduit power or power from a parallel conduit (not shown) may deliver power to the parking location(s) as shown with EV power conduit 17. The conduit may extend below grade, reaching the center of the parking location's 205 longitudinal axis. From there, for example, the conduit may turn in opposite directions along and parallel to the curb 5. The conduit 17 can carry a separate shielded communication data line, or a separate conduit with a communication data line disposed alongside, for example. The power or the power and data conduit 17 may, for example, extend the length of the PMD zone 11.

In this particular implementation example, having the parking location 205 feed at approximately the longitudinal center of the zone 11 optionally reduces the conductor load inside conduit 17 that in turn reduces the conductor gauge size. Each parking location 205 conductor may couple to a plurality of power induction coils 80 wherein each coil 80 has a unique address and has a coverage area 81 within a parking location 205.

This addressability, as explained above, has particular utility for implementation of the electrification of PMD infrastructure; such is particularly true for both wired (i.e., connected) and wireless power inducing charging system components managed by PMD implemented technology rely on the associative relationship between a PMD and its managed parking locations offering power to charge EVs parked therein. Therefore, for example, it should be understood that charging equipment controlled by a PMD may comprise a plurality of wireless power induction coils disposed in a parking location and managed by a particular PMD. Power for the power induction coils can be drawn from the electrical circuits of at least one of: street lights, area lights, and signaling light poles, in proximity to or associated with a PMD. As such, that power may then be available for all parking locations within a zone coverage of a particular PMD.

Thus, it should be understood that, in implementation, the extension of the PMD technology to the present technical implementation may involve, for example, having unique addresses associated with each PMD, wherein the zone each PMD manages could also have a unique sub-address, the parking locations may have a unique sub-address, and each of the wireless power induction coils disposed in the parking location could have a unique sub-address. Likewise, when implemented to provide connected charging, the charging cable could likewise have a unique sub-address with associated, stored specifications, e.g., the type of connector on the cable, the length of the cable, etc.

In this way, the constituent charging components associated with a PMD, e.g., the wireless power induction coils' sub-address may be associated with the parking location they are located within, and the parking location address may be associated with the zone sub-address it is located within, wherein all sub-addresses are associated with the address of the PMD.

Returning to the exemplary configuration illustrated in FIG. 2, the coil 80 may be communicatively coupled to the PMD 50 and upon coupling with a receiving coil 90 coupled to a vehicle 215, the PMD 50 controls at least one of: the charge duration, and the amount of power charged. The above power and duration input can be a preconfigured setting and/or input entered through verbal and/or display screen with an interface inside a vehicle 215 and/or through a handheld device. The communication to each of the power induction coils 80 can be wired and/or wireless. The communication device communicates with at least one of: a PMD 50, a vehicle 215, and a handheld communication device.

Figure 3:
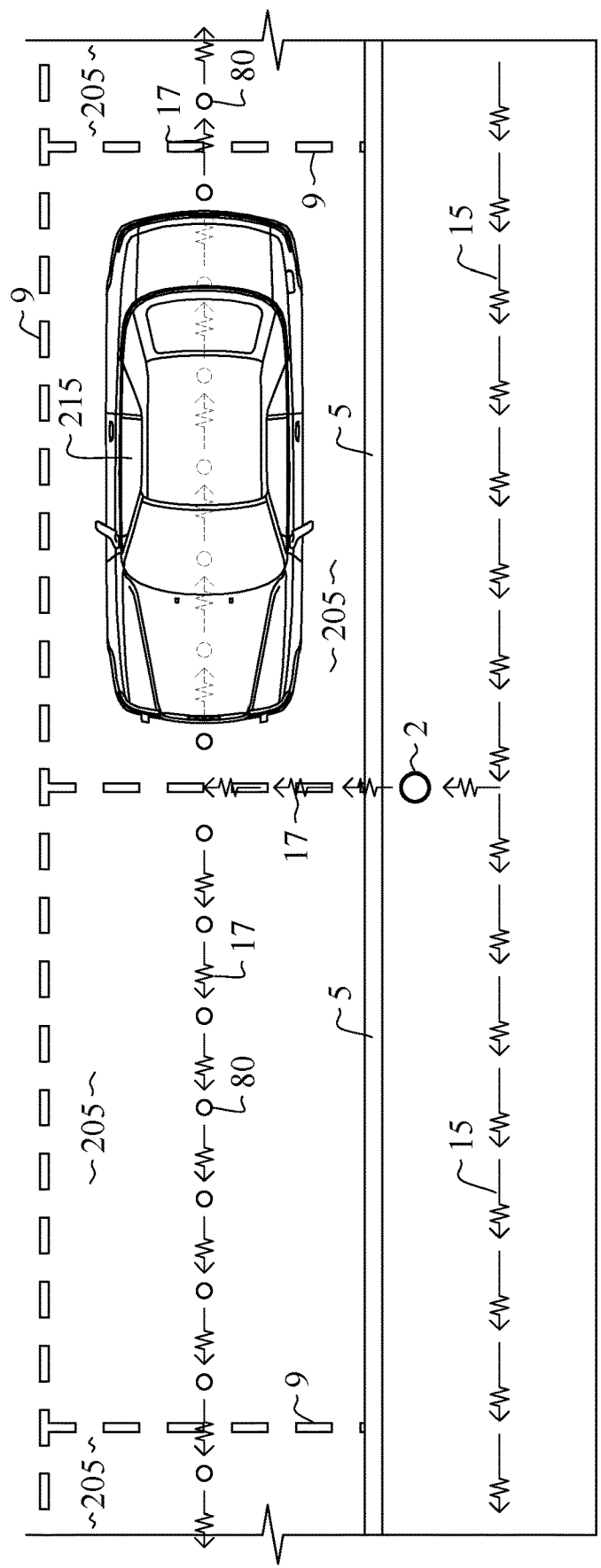
FIG. 3 illustrates a plan view of an example of two vehicle parking locations longitudinally disposed along a sidewalk curb in a configuration of "street parking" provided in accordance with at least one disclosed embodiment.

FIG. 3 shows a plan view of two vehicle parking locations 205 longitudinally disposed along a sidewalk curb 5 with a pole 2 positioned on the sidewalk and aligned with the dividing line 9 between the two parking locations 205. This figure shows that the placement of power or power and data conductors 17 with the power induction coils 80 within a parking location 205 may be configured to accommodate a variety of vehicle 215 sizes, orientation, and navigational capabilities.

Accordingly, as shown, power conductors 15 disposed below the sidewalk extend the length of the sidewalk with a tributary conduit entering the pole 2. In this figure, the EV power conductor conduit 17 may originate at a pole and extend below grade to the parking location's 205 center. From there, the conduit 17 may turn in opposite directions and extend the length of the zone 11 of vehicle locations disposed at the center of the parking locations 205 parallel to the curb 5.

In FIG. 3, a vehicle 215 is shown parked in one of the parking locations 205 with its longitudinal center aligned with the EV power conduit 17. Power induction coils 80 may be coupled to the power conduit 17 disposed apart in repeated modules.

Accordingly, it should be understood that in fixed coils, one coil may be coupled to a pavement 6 surface and the other to the underside of a vehicle 215. In this implementation, the optional advantage of utilizing a fixed design is the absence of moving parts that, over time, may fail as a result of their repeated movement. More specifically, an optional fixed coils designs place the task of the coils 80, 90 alignment on the vehicle's 215 and/or the driver navigational capability and skill.

In this implementation, the power receiving coil 90 coupled to the vehicle may be disposed in the vicinity of the longitudinal axis of the vehicle chassis with the power induction coil 80 in proximity to the central longitudinal axis of the parking location 205. Such placement may facilitate alignment of different vehicles' dimensional width and vehicles' longitudinal orientation.

In other parking location 205 configurations, in which the longitudinal central axis may not be parallel to the curb 5 (not shown), the EV power conduit 17 may optionally diverge in an opposite direction at the center of each parking location 205 and extends the length of the parking zone 11.

At each of the parking location's 205 midpoint, a tributary EV power conduit 17 may extend along the longitudinal central axis of the parking location 205.

Power induction coils 80 may be coupled to the EV power conductor 17 within each parking location 205. The number of coils 80 may be, for example, contingent on each coil's power induction capability within its designated zone 81. Thus, each power induction coil zone 81 may have a unique address associated with the coil 80. As a result, the coil 80 with its unique address can be controlled by at least one of: a PMD 50, a parked vehicle 215 within the same parking location 205, a handheld device associated with the parked vehicle 215, or some combination thereof.

In addition, at least one power induction coil 80 in a parking location 205 can be configured to couple to at least one of: a sensing device 18, and a homing signal emitting beacon to assist in navigating the vehicle 215 to align with a power induction coil 80.

FIGS. 4A, 4B, and 4C show cross-sections of various examples of parking locations. FIG. 4A shows an EV 215 parked in a parking location 205 in the vicinity of a pole 2. In this example, an Intermediate Device Structure (IDS) 10 is illustrated and coupled to one end of, for example, a mast arm, and the other end of the mast arm coupled to pole 2. In this example, the PMD 50 may manage zone 11, which includes a plurality of parking locations 205, and is coupled to the IDS 10. Also coupled to the IDS 10 may be a camera 60, coupled to the IDS 10 bottom and configured to provide a live feed of image data to PMD 50 processor, showing (in dashed lines) the activity at least within its managed zone 11 below.

Thus, as illustrated, the dashed line rectangle positioned over the pole 2 at a vehicle's height is a representation of the charging station 100. This implementation of a pole mounted charging station 100 is an alternate means to charge EV vehicles 215 that require a plug-in 280 connectivity. This alternate configuration of charging station may supplement the wireless charging configurations discussed herein.

As shown in the figure, the vehicle 215 is parked in a parking location 205 abutting a sidewalk curb 5. The vehicle's 215 vertical center axis 25 is aligned with a power induction coil 80 embedded in the parking location 205 pavement 6. The placement of the power induction coils 80 in the parking location 205 may accommodate various, differing vehicle 215 sizes, wherein the largest vehicle width 35 of vehicle 215 that abuts the sidewalk curb 5. In this figure, power from a power conductor 15 may be provided through the pole 2 being transmitted through an EV power conductor 17 that is connected to the parking zone 11 power induction coils 80. A power receiving coil 90 may be coupled to the chassis of a vehicle 215 and may be vertically aligned with the power induction coil 80, providing optimal power transfer between the coils 80, 90.

FIG. 4B shows a section view of an example of a parking location 205 with a power induction coil 80 embedded in the parking location pavement 6. FIG. 4C shows a section view of an example of a parking location 205 view with a power induction coil 80 disposed on the surface of the pavement 6.

In other configurations (not shown), a power or power and data strip can be surface mounted or embedded in the parking location 205 pavement 6 as discussed herein. Further, it should be understood that, in both configurations of a stand-alone power induction coil 80 and a power strip implementation, it is conceivable that the coil 80 can be detachable and can be coupled to at least one of a sensing device 18, and a communication device.

Figure 5:
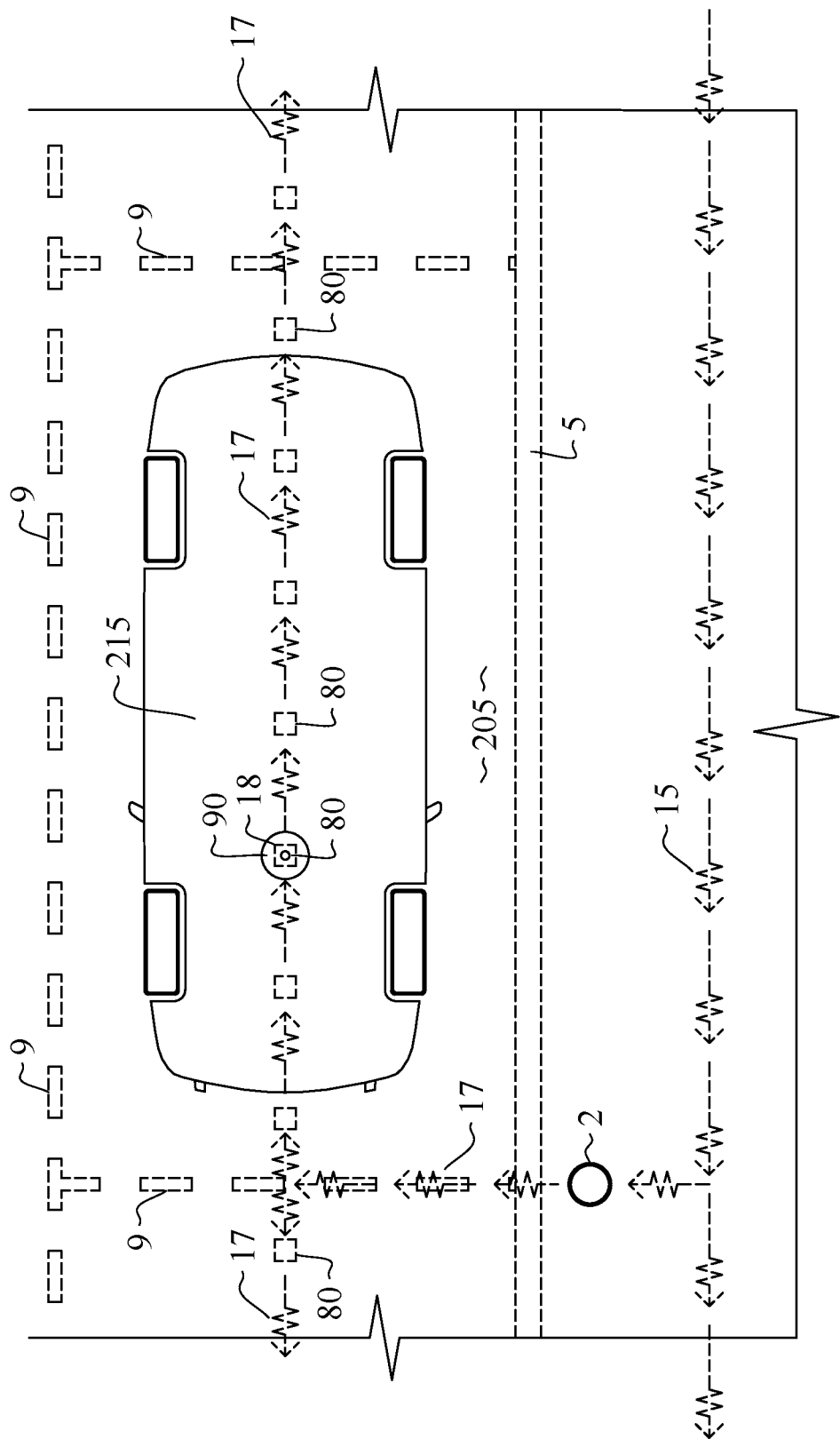
FIG. 5 shows a worm's eye view (a view of an object from below) of a vehicle parked in a parking location in accordance with disclosed embodiments.

FIG. 5 provides a worm's eye view below of an implementation example wherein a vehicle 215 is parked in a parking location 205. As illustrated, in this example, the parking location 205 and the adjacent sidewalk curb 5 are below the plane of viewing and illustrated with dashed lines. The vehicle 215 is parked parallel to the curb 5 with its longitudinal central axis aligned with an array of power induction coils 80 spaced apart at a repeated module. As explained herein precise alignment between the power induction coil 80 and the power receiving coil 90 is preferred for both power transfer efficiency and for safety reasons.

As shown in FIG. 5, a power receiving coil 80 (illustrated as a circle) is vertically aligned with a power induction coil 90 (illustrated as a square). The power receiving coil 90 may be coupled to a chassis of vehicle 215 or otherwise included in the vehicle 215. As should be understood from review of FIG. 5, disclosed embodiments, enable charging of any vehicle regardless of where the power induction coil 80 is disposed at the bottom side of a vehicle 215, provided the power receiving coil 90 is located in proximity to the longitudinal central axis of the vehicle 215.

As further illustrated in FIG. 5, at the center of both round and square images is a sensing device 18 (also represented by a circle). This sensing device 18 may be configured to provide sensor data indicating, for example, at least one of the intensity and directionality of an electromagnetic field in the vicinity of the sensor. As explained herein, this sensor data may be utilized to assists vehicle 215, and/or the PMD 50 to navigate the vehicle 215, to establish a precise alignment between the power inducing 80 and the power receiving 90 coils as part of, or in conjunction with vehicle registration performed for parking and charging. As further explained herein, alternatively, in at least some embodiments, the sensing device 18 can be replaced with homing signal emitting device or can operate in conjunction with such a homing device. Such homing devices and/or sensing devices can be coupled to at least one of the coils 80, 90 and/or the pavement 6 in vicinity of the coils 80, 90. Still further, such homing devices and/or sensing devices may work in coordination with similar equipment that is part of an EV.

Figure 6:
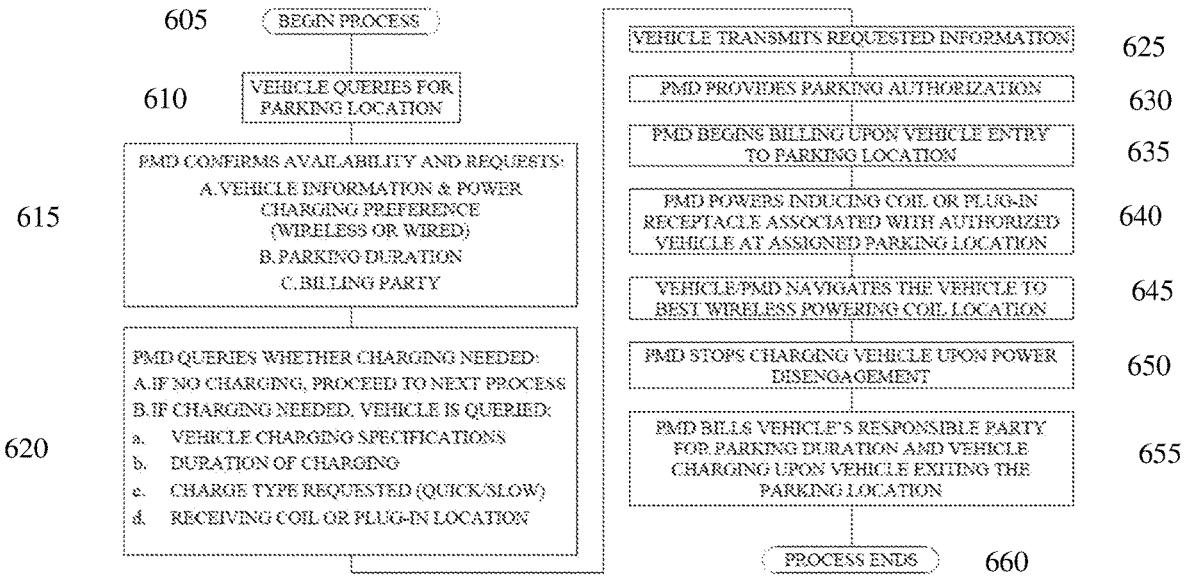
FIG. 6 is an illustration of control and communication operations provided in conjunction with wireless charging performed in accordance with the disclosed embodiments.

FIG. 6 is an illustration of control and communication operations provided in conjunction with wireless charging performed in accordance with the disclosed embodiments.

As shown in FIG. 6, such operations may be performed in various different implementations based on human to machine, machine to human, machine to machine and machine to machine and human interface configurations.

Regardless of the particular implementation specifics, the PMD process flow may begin at 605 and control may proceed to 610, at which an EV query for a parking location is received. In response to that receipt, at 615, the PMD may confirm availability of parking and request various data necessary to begin the vehicle registration and parking alignment process, e.g., vehicle identification information, power charging preferences and specifications, requested period of parking and/or charging, billing information etc. As explained herein, such information may be provided automatically by the EV, by a mobile application on a user's mobile device and/or via driver/user input either via such equipment or, potentially, at a PMD user interface. Thus, at 620, the PMD may output various queries regarding charging requirements and requests shown. Control then proceeds to 625, at which the requested information is received. The process then proceeds to 630, at which the PMD processes the information and provides a parking authorization to the EV. Control then proceeds to 635, at which the PMD begins billing the EV for entry to the parking location. Thereafter, at 640, the PMD powers inducting coil(s) or a plug in charging cable for subsequent use in charging the vehicle.

Subsequently, operations are performed for positioning the EV to the most effective position for vehicle charging (i.e., alignment) at 645.

At some time later, at 650, the PMD stops charging the EV upon power disengagement. This may occur as a result of a number of different events, e.g., completion of charging of the EV, manual override of the charging by a user, etc. Following completion of charging, the PMD may then bill the responsible party for both parking and charging at 655. As is known, such billing may occur via credit card, subscription or any other mechanism conventionally known for parking or charging transaction payment. Thereafter, the operations end at 660.

As should be appreciated from the foregoing description, there is a great deal of communication and analysis necessary to perform registration of an EV in a charging parking space. Still further, there is significant communication and analysis required for the alignment of an EV in such a parking space. As a result, in various implementations of the disclosed embodiments, the PMD may utilize software including learning software commonly referred to as Artificial Intelligence (AI) software to learn and retain data necessary for registration and alignment of a particular EV, EVs of a type similar to a previously registered and aligned vehicle, etc.

For example, in preparation, as part of registration or, as a result of such registration, the PMD may be communicatively coupled to one or more computer processors included in an EV to obtain the precise location of the wireless power receiving coil for the EV model. In such an example, the PMD's processor, or embedded instructions (e.g., AI code) could then automatically or semi-automatically determine and/or configure which of the wireless power induction coils associated with the PMD would provide the power transfer. For example, this may involve, selecting which coils would provide the best coupling while providing maximum clearance between one EV and another vehicle parked in a neighboring parking location.

Still further, various embodiments may be configured to control operation of the electric charging stations such that power to the selected wireless power induction coil address in the selected address parking location may be controlled to be established only after vehicle specific or driver specific information is received, analyzed, and authenticated to ensure that there is, for example, the EV is authorized to park in a particular location based on government issued permits, an approved billing party has been identified and approved, the EV has been authorized to park within the designated sub-address parking location for the prescribed period of time requested by the driver, the EV effectively occupies only the location prescribed and permitted for at least the wireless power induction coil, and the EV and/or the driver are authorized to commence charging based on any other constraints, e.g., special permit constraints associated with movers, parades, emergencies, etc.

As explained above, to attain the most efficient power transfer, and for safety reasons, the wireless power induction coil and the power receiving coil coupled to the vehicle need to be substantially aligned vertically or in proximity to one another, depending on the induction technology used.

To attain such an alignment, in accordance with at least one embodiment, alignment may be assisted through output of directional information to a vehicle and/or a vehicle's driver. This directional information may be provided in the form of data for use by a vehicle's autonomous or assistive driving functionality to self-park the vehicle. Alternatively, data may be transmitted to the vehicle that enables a guided parking process by a driver to align the vehicle most appropriately with charging station infrastructure, e.g., wireless charging coil(s) or charging cable equipment for wireless charging. This operation may be implemented, in whole or in part, through exchange of position and other data generated by one or more sensors included in an EV as well as one or more sensors included in the PMD implemented system to identify the relative location of the vehicle to the charging station infrastructure. In its simplest terms, this data may determine and monitor the relative placement of a vehicle's wireless receiving coil(s) and an electromagnetic sensor coupled to the vehicle. Accordingly, it should be understood that the vehicle's processor(s) may be coupled to the sensor, a power receiving coil, and to a bi-directional communication module (e.g., including one or more communication transceivers).

As explained with reference to FIG. 6 above, communication between a PMD, an EV, and potentially a user's mobile device, are necessary to enable registration and alignment. Thus, as part of the registration process, in particular, in association or following the alignment process, the communication module may communicatively couple with a PMD's bi-directional communication module. For example, upon entering a parking location and beginning the registration process wherein the EV requests power recharging approval for some portion of the duration of vehicle parking, vehicle and PMD processors operating based on software code stored in non-transitory computer readable medium memory may perform the following instructions in an automated or semi-automated (involving, for example, EV driver input) as follows:

EV processor communicates the vehicle's location of the receiving power coil the PMD processor.

EV processor communicates the vehicle's power charging specifications to the PMD processor.

EV grants the PMD's processor permission to navigate (or assist EV autonomous or assistive driving) the vehicle within the parking location, the parking zone including the location and/or the geographic vicinity of the parking zone.

PMD processor initiates power flow to a selected wireless power induction coil within a parking location that the EV occupies.

One or more electromagnetic sensors of the PMD or the associated charging station(s) transmit data to the EV processor and/or PMD regarding sensed magnetic field intensity and directionality.

Based on electromagnetic sensor generated data, the EV or PMD navigates (or assists in navigation) of the EV toward a proper parking location to facilitate charging of the EV, e.g., directing the EV to enable a most intense signal emitted from the selected wireless power induction coil within the parking location.

PMD tracks the duration of the parking and the amount of power charged, and bills the party associated with the vehicle.

It should be understood that the above process operations (and potentially those illustrated in FIG. 6) may be initiated prior to the vehicle entering a particular parking location. For example, such operations may be initiated based on determination that a vehicle has entered a zone or parking location vicinity, for example, if the EV is in some level of autonomous or assistive driving functionality or operational mode that is coordinated by the vehicle's infotainment/navigation system. In this way, parking and charging of the vehicle is performed or assisted in a manner that fully supports optimized positioning of vehicle(s) for charging efficiency, effective parking occupancy (e.g., based on physical size of vehicles, etc.).

Further, it should be understood that the processes described above reflect only a limited number of the basic overall operational processes associated with the example of coupling of wireless electric charging station components with PMD implemented functionality and one or more EVs. Thus, it should be recognized and appreciated that additional functionality and processes can be added, substituted or otherwise incorporated.

For example, in lieu of relying on equipment to enable an electromagnetic sensor coupled to a vehicle for coil alignment, a power induction coil of the charging equipment may emit a unique RF signal utilized by the system to enable alignment with the EV's power receiving coil by having a receiver coupled to such a coil. Alternatively, an EV driver and/or the EV autonomous and/or assistive driving functionality may operate to align the plurality of coils for wireless charging by visual input displayed on the driver's dashboard display panel as explained above.

As a result, it should be understood that the technical utility of the present innovation is rooted in the ability to effectively implement EV charging capability in common parking locations within urban settings, drawing power from lighting poles of various types and being managed by a PMD, optionally performed in cooperation with other PMDs to provided EV charging in a distributed, cost efficient, load balanced manner.

The foregoing explanation has focused on the interaction a PMD with associated charging station(s) and an EV. However, the technical utility of the present innovation is not limited to this particular aspect of the innovation. Rather, because of the distributed and intelligent nature of a network of PMDs located in an urban environment, the presently disclosed embodiments can provide improved load balancing of electrical network loads to intelligently manage charging requirements of a plurality of vehicles.

More specifically, as discussed above, in the present technical implementation of Applicant's PMD implemented technology, each PMD may have a unique address and a bi-directional communication module configured to enable direct communication with and control of each of the wireless power induction coils disposed within each of the parking locations within a zone.

Such communication and control may include at least one of, for example, directing power to a uniquely addressed wireless power induction coil at any of the parking locations within the managed zone, turning on/off any of the wireless power induction coils, and/or modulating the power flowing through the wireless power induction coil in each parking location to match the specific vehicle model charging specified requirements within a pre-configured charging duration.

In physical installation of components for wireless charging, for example, a plurality of the wireless power induction coils disposed inside each parking location may be spaced apart in proximity to the longitudinal axis of the parking location. Optionally, use of a plurality of power induction coils may provide access to wireless power connectivity to all EVs despite an absence of an industry-wide standard for a power receiving coil location (or an evolving and dynamically changing standard regarding this specification and others).

An alternate solution not shown but recognized and disclosed herein by Applicant is a continuous power strip disposed in proximity to a longitudinal axis of a parking location. Such a continuous power strip may have a plurality of power induction coils positioned along a longitudinal axis, wherein the form, size, and power transfer capabilities of the coils may vary and be provided to correspond to differing EV charging requirements. Thus, in this and other installation implementations, the plurality of wireless induction coils may align in proximity to the longitudinal axis of the parking location and be controlled by the PMD. In this regard, the PMD may also work with or include equipment configured to enable the EV charging system to register the location of an EV, its constituent charging components required to interface with the charging system (e.g., vehicle components for charging such as charging coils or an interface for connected cable charging for example. In this way, the PMD implemented system may assist in automated or semi-automated charging of a vehicle and/or relative positioning of an EV in relation to system components to optimize power transfer or improved efficiency of such transfer.

The description of specific embodiments is not intended to be limiting of the present invention. To the contrary, those skilled in the art should appreciate that there are numerous variations and equivalents that may be employed without departing from the scope of the present invention. Those equivalents and variations are intended to be encompassed by the present invention.

For example, it should be understood that constituent elements the electric charging station equipment and EV equipment may alter positioning of some structural elements and operational aspects thereby influencing the ordered combination of operations to provide system functionalities. Thus, the physical and functional specifications of elements may include, for example, the size, shape, and quantity of wireless power induction coil(s), a distance between a coil(s) and the power receiving coil of the EV, and the power induction coils' mounting location within the parking location.

It should be further understood that a mounting location of a power induction coil may be fully embedded in pavement of the parking location, positioned on a pavement surface, or partially embedded in pavement or horizontal support structure of the parking location, e.g., consider a level of a parking structure wherein power for EV is provided through the electrification network for lighting in the infrastructure or, in particular, a roof level, wherein the electrification for the overhead security lighting is similarly used to provide power for EV charging. Still further, it should be understood that the charging of EVs may be provided using power derived from solar energy generated principally or partially to power street or security lights. It is conceivable that solar energy technology may provide this level of power generation and it should be understood that the present embodiments may be implemented in conjunction with such functionality.

Likewise, as briefly discussed above, in the U.S., lighting poles in the U.S., with the exception of signal lighting, are non-operational during the daytime. In other words, although power is still supplied to the poles throughout a twenty-four hour period, the lighting poles only draw power during that portion of the time that requires lighting of the street environment. It should be understood that presently disclosed embodiments may be implemented to provide electric charging of EVs based on the power that is directly delivered to the lighting poles by the lighting infrastructure network. Such functionality may be provided for connected charging, wireless charging or both.

It is anticipated that the power induction coil technology will evolve, reducing the size of the power induction coils and corresponding coils coupled to vehicles. Further, it should be understood that any of the alignment operations described herein are meant to enable what may be termed "relative position alignment," which may involve movement of an EV (and/or its constituent components) to be more or less proximate to charging equipment of a charging station, movement of the charging equipment to be more or less proximate to the EV components and/or both. In other words, it is conceivable that registration, in particular, alignment, functionality of the disclosed embodiments may involve multiple modes of alignment operation that may include sensor-enabled positioning of one or both of EV components and charging station components.

In the above-description of various embodiments, reference is made to the accompanying drawings, which form a part hereof, and in which is shown, by way of illustration, various embodiments in which the invention may be practiced. It is to be understood that other embodiments may be utilized and structural and functional modifications may be made without departing from the scope and spirit of the present invention.

For example, although various configurations have been explained with reference to configurations in which a PMD is in indirect or direct communication with one or more sensors and/or homing beacon(s) associated with a vehicle to be parked and charged, it should be appreciated and understood that a PMD can also be directly or indirectly communicatively coupled to additional vehicles that can assist in at least navigating an EV to be parked and/or charged. Such collaboration between Vehicles and Infrastructure (V2X) and also Vehicle to Vehicle (V2V) provide improved volume and diversity of perspective through additional sensors (positioned in a variety of locations in proximity to an EV to be parked and charged) and also increased processing power.

Moreover, it should be understood that various connections are set forth between elements in the following description; however, these connections in general, and, unless otherwise specified, may be either direct or indirect, either permanent or transitory, and either dedicated or shared, and that this specification is not intended to be limiting in this respect.

Further, it should be understood that different charging prices may be billed to an EV driver based on a rate of charge. Likewise, intelligent management of charging rates may be controlled so as to gauge the charging rate based on the parking period purchased by an EV user. In this way, an EV power supply may be charged as slow as possible while still fulfilling the mobility needs of the driver. This implementation may have particular technical utility because slow charging of onboard power supplies, e.g., batteries, is generally recognized as preferred to maximize life of such power sources. Further, it should be understood that the power source could change from present technology however, that by itself should not negate the system solution.

The invention being thus described, it should be understood that the same may be varied in many ways. Such variations are not to be regarded as a departure from the spirit and scope of the invention, and all such modifications as would be obvious to one skilled in the art are intended to be included within the scope of the following claims.

LIST OF ELEMENTS

2 Pole
5 Curb

6 Pavement
9 Location Dividing Line
10 IDS
11 IDS Coverage Zone
15 Power Conduit/Conductor
17 EV Power Conduit/Conductor
18 Sensing Device
25 Vertical Center Line
35 Location width
50 PMD
60 Camera
80 Power Induction coil
81 Induction coil Zone
90 Power Receiving Coil
100 Charger
205 Parking Location
215 Vehicle
280 Plug-in Cable

The invention claimed is:

1. A system for charging an electric vehicle, the system comprising:
   a first power induction coil and a second power induction coil that in plan view are positioned within a footprint of a parking slot that is a publicly accessible vehicle parking slot;
   a sensor disposed in or on the publicly accessible parking slot and configured to identify whether a position of a wireless receiving coil on an electric vehicle residing in the parking slot is closest to the first power induction coil, or the second power induction coil;
   a processor configured to control selection and actuation, based on an output of the sensor, of the first power induction coil or the second power induction coil to wirelessly charge the electric vehicle; and
   a parking manager device configured to manage permissions for electric vehicles to park in the publicly accessible parking slot as well as other parking slots included in a common parking zone associated with the parking manager device, wherein the parking manager is further configured to manage permissions for the electric vehicle and other electric vehicles to charge via wireless charging while parked in the publicly accessible parking slot or the other more of the plurality of parking slots,
   wherein the parking manager device has a unique address and the common parking zone, parking slots within the common parking zone, and the first power induction coil or the second power induction coil each have associated unique sub-addresses associated with the parking manager device unique address.

2. The system of claim 1, further comprising at least one charging station associated with the parking manager and includes at least one wireless power induction coil disposed in proximity to a longitudinal axis of an associated parking slot and configured with a unique address that is associated with a parking slot unique address.

3. The system of claim 1, wherein the parking manager device receives data from the electric vehicle as part of registration of the electric vehicle for parking and charging, wherein the received data includes identification of the electric vehicle, a location of the wireless receiving coil included in the electric vehicle for wireless charging, and billing information associated with the electric vehicle for parking and charging transactions.

4. The system of claim 1, wherein, upon the electric vehicle's arrival at the parking slot associated with the parking manager device, the parking manager device flows power according to a unique address of a selected power induction coil at the parking slot and an electromagnetic sensor included in the system determines a field strength.

5. The system of claim 4, wherein the determined field strength is utilized to assist in navigation of the electric vehicle to a location within the parking slot for wireless charging so that the wireless receiving coil in the electric vehicle is vertically aligned or in proximity to the closest to the first power induction coil, or the second power induction coil.

6. The system of claim 1, wherein the power to a selected one of the first power induction coil, or the second power induction coil is drawn from at least one of: roadway, area, and signaling lighting pole electrical circuitry.

7. The system of claim 1, wherein a plurality of other wireless power induction coils are disposed in the vicinity of the longitudinal central axis of the parking slot and within the footprint of the publicly accessible vehicle parking slot.

8. The system of claim 7, wherein each of the other wireless power induction coils is disposed in the parking slot, wherein each of the other wireless power induction coils has a sub-address that is associated with the parking slot sub-address.

9. The system of claim 8, wherein the parking manager device also controls the power to the other wirelessly power induction coils disposed within the parking slot.

10. The system of claim 9, wherein of the parking manager device includes a processor that is configured to obtain specific power charging requirements for the electric vehicle parked in the parking slot and supplies power to a closest to the first power induction coil, or the second power induction coil that is compatible with a charging requirement of the electric vehicle.

11. The system of claim 9, wherein the other wireless power induction coils are disposed on/in at least one of: a pavement surface, partially embedded in the pavement, fully embedded inside the pavement or so configured and detachable therefrom.

12. The system of claim 1, wherein a vehicle processor coupled to an electromagnetic sensor and/or a parking manager device navigates the electric vehicle to align the wireless power receiving coil over a selected wireless power induction coil.

13. The system of claim 1, wherein a vehicle processor coupled to an electromagnetic sensor displays to a driver a location of a selected wireless power induction coil within the parking slot.

14. The system of claim 1, wherein the parking manager device meters at least one of: parking duration and power dispensed, and bills a billing party.

15. The system of claim 1, wherein the parking manager device is in direct or indirect communication with at least one sensor and/or homing device of the electric vehicle parked in the parking slot of the parking zone associated with the parking manger device, wherein such communication provides data used by the parking manager device to facilitate parking or charging of the electric vehicle presently undergoing alignment for parking and charging.

16. A system configured to select among stationary wireless power induction coils in a publicly accessible vehicle parking slot for alignment with a mobile power receiving coil coupled to an electric vehicle, the system comprising:
   a first power induction coil and a second power induction coil that in plan view are positioned within a footprint of the publicly accessible vehicle parking slot,
   a parking manager device associated with and configured to control operation of the first power induction coil and the second power induction coil, wherein the publicly accessible vehicle parking slot and other parking slots are disposed within a parking zone associated with the parking manager device, and the first power induction coil and the second power induction coil are communicatively coupled to the parking manager device that manages the parking zone, the parking manager device has a unique address and comprising a processor, wherein the publicly accessible vehicle parking slot and the first power induction coil and the second power induction coil have unique sub-addresses associated with the parking manager device unique address;

an electric vehicle processor that is hosted in the electric vehicle and is communicatively coupled to the parking manager device, wherein the parking manager device is configured to grant and assign vehicle parking privileges at a designated parking slot address, under a condition the electric vehicle is positioned within the publicly accessible vehicle parking slot, the processor of the parking manager device is configured to detect and select a closer of the first power induction coil and the second power induction coil in relation to the mobile power receiving coil on the electric vehicle based on a most intense signal emitted from the first power induction coil or the second power induction coil, and the vehicle processor and the parking manager device cooperate to assist in navigating the electric vehicle to a position in the parking where the wireless power induction coil is in closest vertical proximity to a selected one of the first power induction coil and the second power induction coil based on the most intense emitted signal.

17. The system of claim 16, wherein the parking manager device is in direct or indirect communication with at least one sensor and/or homing device of a vehicle parked in a parking slot of the parking zone associated with the parking manager device, wherein such communication provides data used by the parking manager device to facilitate parking or charging of an electric vehicle presently undergoing alignment for parking and charging.

18. A method for charging an electric vehicle, the method comprising:

controlling a first power induction coil and a second power induction coil that in plan view are positioned within a footprint of a publicly accessible vehicle parking slot a processor configured to control selection and actuation, based on an output of the sensor, of the first power induction coil or the second power induction coil to wirelessly charge an electric vehicle;

sensing with a sensor disposed in or on the publicly accessible parking slot and configured to identify whether a position of a wireless receiving coil on the electric vehicle residing in the parking slot is closest to the first power induction coil, or the second power induction coil;

managing permissions, by a parking manager device, for the electric vehicle and other electric vehicles to park in the publicly accessible parking slot as well as other parking slots included in a common parking zone associated with the parking manager device and to charge via wireless charging while parked in the publicly accessible parking slot or the other more of the plurality of parking slots, wherein the parking manager device has a unique address and the common parking zone, parking slots within the common parking zone, and the first power induction coil or the second power induction coil each have associated unique sub-addresses associated with the parking manager device unique address.

19. The method of claim 18, wherein upon the electric vehicle occupying a particular parking slot, the parking manager device directs power to a closest to the first power induction coil, or the second power induction coil to the wireless receiving coil and a determination of a direction of a most intense field strength is used to assist navigation of the electric vehicle to a position in the parking slot where the closest of the first power induction coil and the second power induction coil is in vertical proximity to the wireless receiving coil.

20. The method of claim 19, wherein the parking manager device is in direct or indirect communication with at least one sensor and/or homing device of the vehicle parked in a parking slot of the parking zone associated with the parking manger device, wherein such communication provides data used by the parking manager device to facilitate parking or charging of the electric vehicle presently undergoing alignment for parking and charging.

* * * * *